United States Patent [19]

Heffer

[11] 3,850,668

[45] Nov. 26, 1974

[54] IMPREGNATION OF GRAPHITE WITH RUTHENIUM COMPOUNDS

[75] Inventor: John Philip Heffer, London, England

[73] Assignee: Johnson, Matthey & Co. Limited, London, England

[22] Filed: June 5, 1972

[21] Appl. No.: 259,674

[52] U.S. Cl............ 117/47 R, 117/119, 117/160 R, 117/169 R, 117/227, 117/228, 117/DIG. 11, 252/503, 252/506, 252/514
[51] Int. Cl............................ B01k 3/08, B44d 1/20
[58] Field of Search............. 117/169, 119, DIG. 11, 117/160 R, 228, 47 R, 47 H; 252/503, 506, 514

[56] References Cited
UNITED STATES PATENTS

| | | | |
|---|---|---|---|
| 3,126,296 | 3/1964 | Moutaud | 117/119 |
| 3,265,526 | 8/1966 | Beer | 117/160 R |
| 3,329,527 | 7/1967 | Harris | 117/228 |
| 3,428,544 | 2/1969 | Bianchi et al. | 252/514 |
| 3,567,618 | 3/1971 | Foulletier et al. | 117/228 |

FOREIGN PATENTS OR APPLICATIONS

| | | | |
|---|---|---|---|
| 936,912 | 9/1963 | Great Britain | 117/228 |
| 1,114,595 | 5/1968 | Great Britain | 117/160 R |

*Primary Examiner*—William D. Martin
*Assistant Examiner*—Sadie L. Childs
*Attorney, Agent, or Firm*—Cushman, Darby & Cushman

[57] ABSTRACT

The invention described in this specification concerns the impregnation and/or coating of a body of graphite or carbon with ruthenium metal or a ruthenium compound or both. The method comprises removing gaseous fluid from the carbon or graphite body, contacting the body with a solution or suspension of the ruthenium metal or ruthenium compound and evaporating or allowing to evaporate the solvent or suspending medium so as to leave the ruthenium metal or ruthenium compound in contact with the body. To assist evaporation of the solvent or suspending medium the body may be heated.

5 Claims, No Drawings

IMPREGNATION OF GRAPHITE WITH RUTHENIUM COMPOUNDS

This invention relates to the impregnation and/or coating of a body of graphite or carbon with ruthenium metal or a ruthenium compound or a mixture of ruthenium metal and a ruthenium compound. Throughout this specification the term "treating" or "treatment" will be used to include impregnating and/or coating as the context requires.

The invention is particularly, but not exclusively concerned with methods of treating as herein defined a body of graphite or carbon with ruthenium metal or an oxide of ruthenium or a mixture of the two. The invention includes a process whereby a substantially uniform and, if desired, a predetermined level of treatment of a carbon or graphite body with ruthenium metal or a ruthenium compound such as the oxide, or a mixture of ruthenium metal and a ruthenium compound may be achieved.

Carbon or graphite bodies treated in accordance with the invention with ruthenium metal or ruthenium oxide or both are especially useful as electrodes in the electrolysis of brine.

According to one aspect of this invention a method of treating a body of carbon or graphite with ruthenium metal or a ruthenium compound or both comprises removing gaseous fluid from the body, contacting the body with a solution or suspension of the ruthenium metal or ruthenium compound and evaporating or allowing to evaporate the solvent or suspending medium so as to leave the ruthenium metal or ruthenium compound in contact with the body. Preferably the carbon or graphite body is porous and may be of massive or particulate form. Where the body is of porous massive form the body is contacted with the solution or suspension so that it enters into the pores whereby, after evaporation of the solvent or suspending medium, the ruthenium metal or ruthenium compound is deposited at least within the pores of the body. Where the body is in particulate form the particles treated in accordance with the invention may be compresssed to form a unitary structure or simply closely packed to a desired shape.

According to another aspect of the invention, a method of treating a body of carbon or graphite with ruthenium metal or a ruthenium compound or both comprises evacuating gaseous fluid from a chamber in which the body is located and thereby evacuating the pores of the body, flooding the chamber with a solution or suspension of ruthenium metal or a ruthenium compound and introducing the solution or suspension into the pores of the body by breaking the vacuum within the chamber in contact with the solution or suspension and thereby causing the liquid to be drawn into the chamber, removing the body from the liquid, heating the body so as to drive off the solvent or the suspending medium and, optionally, and either prior to, simultaneously with or subsequently to the heating step in which the solvent or suspending medium is driven off, treating the body in such a way as to cause at least the ruthenium compound which is within the pores of the body to decompose.

The decomposition of the ruthenium compound may, in certain cases, be achieved by introducing a material, as later exemplified, into the pores of the body which will promote the decomposition, especially when a solution of the ruthenium compound still remains in the pores. In other cases, the ruthenium compound may be decomposed by heating the body to a temperature above the decomposition temperature of the ruthenium compound after the solvent has been driven off.

When a substantially uniform level of impregnation of the body is desired, it is preferable to cause a ruthenium compound to be deposited within the pores of the body which is capable of being decomposed by heat but which, before the decomposition temperature is reached, tends to sublime or otherwise to be volatilised so that an atmosphere of the compound is formed within the pores of the body before the final decomposition of the compound is accomplished.

One method of impregnating a graphite body with ruthenium metal and ruthenium oxide in accordance with the invention so as to achieve a substantially uniform and predetermined level of impregnation will now be described by way of example. In essence the method comprises: preparing ruthenium acetyl acetonate; measuring the pore volume of the graphite body; calculating the weight of ruthenium acetyl acetonate which will need to be deposited within the pores to give the desired ruthenium content within the body; preparing a solution of ruthenium acetyl acetonate of appropriate strength in chloroform, introducing the solution into the pores and then heating the body gently to drive off the solvent and finally heating more strongly to decompose the resulting deposit of ruthenium acetyl acetonate.

In an actual experiment, the ruthenium acetyl acetonate was first prepared by taking 25 gm. of a ruthenium trichloride which contained 40.59 wt% ruthenium; dissolving this in 500 ml. of glacial acetic acid; adding 34 ml. of acetyl acetonate (amounting to about a 10% excess); boiling the resulting liquid under reflux for two hours with steady evolution of HCl; evaporating the final liquid to dryness in an evaporating dish and then extracting the residue with 250 ml. benzene. This liquid was then evaporated and gave 12.2 gm. of a deep reddish-purple crystalline mass of crude ruthenium acetyl acetonate, corresponding to a 31% yield.

The graphite body to be impregnated was a rod and was placed in a container which was first evacuated and then flooded with water by breaking the vacuum under water. Next the graphite rod was removed from the container, carefully dried and reweighed. The gain in weight was found to be 1.5952 gm. corresponding to a porosity of 18%.

A 15% solution of the ruthenium acetyl acetonate in chloroform was next prepared; the electrode was heated to drive off the water; allowed to cool and placed in a chamber which was then evacuated and finally flooded with the previously prepared solution of ruthenium acetyl acetonate.

On removal from the chamber, the surface of the electrode was carefully dried and the electrode then heated for 1 hour at 100°C to drive off the chloroform. Finally the electrode was heated in a furnace for 15 minutes at 300°C to decompose the ruthenium acetyl acetonate. It is believed that under the conditions of the experiment, at least some of the ruthenium metal which, in the absence of oxygen, would have been produced by the decomposition of the ruthenium acetyl acetonate, was converted to an oxide of ruthenium.

When cold, the electrode was reweighed and found to have gained 0.1078 gm. in weight. On the assumption that the ruthenium present in the body was in the form of the dioxide ($RuO_2$), this gain in weight corresponded to a ruthenium content of 0.51 wt%.

In some cases, such as, for instance, when the carbon has low porosity and a relatively high level of impregnation is required, it may be necessary to repeat the above impregnation process more than once.

Ruthenium acetyl acetonate is a preferred compound for use in the method of the invention for the impregnation of a carbon or graphite body with ruthenium metal, or ruthenium oxide or a mixture of the two because its use results in a substantially uniform deposit throughout the body, due, it is believed, to the fact that the ruthenium acetyl acetonate sublimes, so that an atmosphere of the compound is formed more or less throughout the body, before it decomposes.

Other solutions which may be used for impregnating a carbon or graphite body with ruthenium or ruthenium oxide or both in accordance with the invention include those listed below all of which tend to produce a relatively heavy deposit in the outer zones of the body and a weaker deposit in the interior. The deposits obtained from solutions 1 - 3 are decomposed by heating whereas, the decomposition of the deposit from solution 4 and of the ruthenium compound in solution in the case of solution 5 is achieved by the addition of a further chemical.

1. an aqueous solution of "ruthenium red" described in Parkinson's General and Inorganic Chemistry as having the formula $[RuCl(OH)(NH_3)_4]$ $Cl.H_2O$;
2. an aqueous solution of nitrosyl ruthenium nitrate $[RuNO(NO_3)_2]$;
3. an aqueous colloidal solution of ruthenium oxide ($RuO_2$) — formed by refluxing $RuO_2$ with nitric acid with the steady addition of hydrazine;
4. an aqueous solution of ruthenium trichloride ($RuCl_3$). After impregnation of the carbon or graphite body with the solution, the water is driven off and the body is then impregnated with caustic soda solution;
5. an aqueous solution of sodium ruthenate (formed by dissolving ruthenium tetroxide in caustic soda solution). After impregnation with the sodium ruthenate solution the body is impregnated with a slight excess of 70% acetic acid to decompose the ruthenium compound and to neutralise the caustic soda present. Following this the body is dried.

The invention also includes any carbon or graphite body, especially a carbon or graphite electrode which has been impregnated with ruthenium or a ruthenium compound or a mixture of the two in accordance with a method of the invention.

What we claim is:

1. A method of treating a porous body of carbon or graphite with ruthenium comprising removing gaseous fluid from the body, contacting the body with a solution of ruthenium acetylacetonate, evaporating the solvent so as to leave the ruthenium compound in contact with the body, and heating the body so as to cause the ruthenium acetylacetonate within the pores of the body to decompose.

2. A method according to claim 1 wherein the body is heated to assist evaporation of the solvent.

3. A method of treating a porous body of carbon or graphite with ruthenium comprising evacuating gaseous fluid from a chamber in which the body is located and thereby evacuating the pores of the body, flooding the chamber with a solution of ruthenium acetylacetonate and introducing the solution into the pores of the body by breaking the vacuum within the chamber in contact with the solution and thereby causing the liquid to be drawn into the chamber, removing the body from the liquid and heating the body so as to evaporate the solvent and decompose the ruthenium acetylacetonate.

4. A carbon or graphite body when impregnated with ruthenium in accordance with the method claimed in claim 1.

5. A method of producing a substantially uniform deposit of ruthenium within the pores of a porous body of carbon or graphite consisting essentially of removing gaseous fluid from the pores of said body located in a chamber under vacuum, flooding said chamber with a solution of ruthenium acetyl acetonate in a solvent therefor, breaking said vacuum whereby said solution enters the pores of said body, removing said body from said chamber, evaporating said solvent and prior to, simultaneously with or subsequent to evaporating said solvent, heating said body to decompose said ruthenium acetyl acetonate.

* * * * *